United States Patent
Sung et al.

(10) Patent No.: US 12,388,153 B2
(45) Date of Patent: Aug. 12, 2025

(54) SEPARATOR FOR LITHIUM SECONDARY BATTERY AND METHOD FOR MANUFACTURING SAME

(71) Applicant: LG CHEM, LTD., Seoul (KR)

(72) Inventors: In-Hyouk Sung, Daejeon (KR); Hye-Jin Kwon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 273 days.

(21) Appl. No.: 16/960,350

(22) PCT Filed: Nov. 13, 2019

(86) PCT No.: PCT/KR2019/015471
§ 371 (c)(1),
(2) Date: Jul. 7, 2020

(87) PCT Pub. No.: WO2020/101363
PCT Pub. Date: May 22, 2020

(65) Prior Publication Data
US 2021/0057698 A1    Feb. 25, 2021

(30) Foreign Application Priority Data
Nov. 14, 2018  (KR) .......................... 10-2018-0140242

(51) Int. Cl.
*H01M 50/446* (2021.01)
*H01M 4/62* (2006.01)
(Continued)

(52) U.S. Cl.
CPC ......... *H01M 50/446* (2021.01); *H01M 4/622* (2013.01); *H01M 10/0525* (2013.01);
(Continued)

(58) Field of Classification Search
CPC .. H01M 50/446; H01M 50/403; H01M 50/46; H01M 4/622; H01M 10/0525
See application file for complete search history.

(56) References Cited

U.S. PATENT DOCUMENTS

2011/0045338 A1* 2/2011 Bae .................... H01M 50/417
                                                        429/144
2011/0195294 A1   8/2011 Lee et al.
(Continued)

FOREIGN PATENT DOCUMENTS

| CN | 102656719 A | 9/2012 |
| CN | 103493253 A | 1/2014 |

(Continued)

OTHER PUBLICATIONS

Swei et al. (Journal of Applied Polymer Science. 90, 1153-1155, (2003)) (Year: 2003).*
(Continued)

*Primary Examiner* — Brian R Ohara
*Assistant Examiner* — Emily Elizabeth Freeman
(74) *Attorney, Agent, or Firm* — Birch, Stewart, Kolasch & Birch, LLP

(57) ABSTRACT

A separator for an electrochemical device having a porous polymer substrate having a plurality of pores; and a porous coating layer formed on at least one surface of the porous polymer substrate. The porous coating layer includes a dispersing agent, a mixture of inorganic particles and a particle-type binder polymer, and a polyvinyl pyrrolidone binder polymer positioned on the whole or a part of the surface of the inorganic particles in the mixture of the porous coating layer to connect and fix the inorganic particles with one another. The content of the polyvinyl pyrrolidone binder polymer is 2 to 20 parts by weight based on 100 parts by (Continued)

weight of the total content of the particle-type binder polymer and the polyvinyl pyrrolidone binder polymer.

13 Claims, 2 Drawing Sheets

(51) Int. Cl.
  *H01M 10/0525* (2010.01)
  *H01M 50/403* (2021.01)
  *H01M 50/443* (2021.01)
  *H01M 50/46* (2021.01)

(52) U.S. Cl.
  CPC ....... *H01M 50/403* (2021.01); *H01M 50/443* (2021.01); *H01M 50/46* (2021.01)

(56) References Cited

U.S. PATENT DOCUMENTS

| | | | |
|---|---|---|---|
| 2013/0244082 A1 | 9/2013 | Lee et al. | |
| 2014/0045031 A1* | 2/2014 | Matsumoto | H01M 50/426 429/144 |
| 2014/0080003 A1* | 3/2014 | Tsuji | H01M 4/485 429/231.1 |
| 2014/0227593 A1 | 8/2014 | Lee et al. | |
| 2015/0140404 A1 | 5/2015 | Yoo et al. | |
| 2015/0263324 A1 | 9/2015 | Lee et al. | |
| 2016/0301055 A1* | 10/2016 | Lee | H01M 10/0565 |
| 2017/0098810 A1* | 4/2017 | Whear | H01M 50/434 |
| 2019/0200001 A1 | 6/2019 | Gu et al. | |
| 2019/0245183 A1 | 8/2019 | Jeong et al. | |
| 2021/0036294 A1* | 2/2021 | Jeon | H01M 50/446 |
| 2021/0226222 A1* | 7/2021 | Morita | C01B 32/174 |
| 2021/0226300 A1 | 7/2021 | Kwon et al. | |
| 2021/0249734 A1 | 8/2021 | Kwon et al. | |

FOREIGN PATENT DOCUMENTS

| | | | | |
|---|---|---|---|---|
| CN | 105556702 A | | 5/2016 | |
| JP | 2013-84367 A | | 5/2013 | |
| JP | 2015-182060 A | | 10/2015 | |
| JP | 2018-15268 A | | 1/2016 | |
| JP | WO2014/103791 A1 | | 1/2017 | |
| JP | 6233404-82 | | 11/2017 | |
| JP | 6233404 B | * | 11/2017 | |
| JP | 2018-32537 A | | 3/2018 | |
| KR | 10-1341196 B1 | | 12/2013 | |
| KR | 10-2014-0070465 A | | 6/2014 | |
| KR | 10-2016-0038598 A | | 4/2016 | |
| KR | 10-2016-0134046 A | | 11/2016 | |
| KR | 10-2017-0138957 A | | 12/2017 | |
| KR | 10-2018-0036626 A | | 4/2018 | |
| TW | 201433453 A | * | 9/2014 | ........... B32B 15/088 |
| WO | WO 2018/147714 A1 | | 8/2018 | |
| WO | WO 2020/171661 A1 | | 8/2020 | |
| WO | WO 2020/197102 A1 | | 10/2020 | |

OTHER PUBLICATIONS

Jirgensons (Solubility and Fractionation of Polyvinylpyrrolidone. Journal of Polymer Science, vol. VIII, No. 5, p. 519-527 (1952)) (Year: 1952).*
Extended European Search Report dated May 21, 2021 for EP Application No. 19884000.1.
International Search Report (PCT/ISA/210) issued in PCT/KR2019/015471 mailed on Feb. 21, 2020.

* cited by examiner

SEPARATOR FOR LITHIUM SECONDARY BATTERY AND METHOD FOR MANUFACTURING SAME

TECHNICAL FIELD

The present disclosure relates to a separator applicable to an electrochemical device, such as a lithium secondary battery, and a method for manufacturing the same.

The present application claims priority to Korean Patent Application No. 10-2018-0140242 filed on Nov. 14, 2018 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous coating layer formed by applying a mixture of an excessive amount of inorganic particles with a binder polymer onto at least one surface of a porous substrate having a plurality of pores.

Such a porous coating layer may be formed by various methods. Particularly, when forming a porous coating layer by using an aqueous solvent and particle-type binder polymer, it is possible to improve heat shrinkage at high temperature significantly.

However, when using an aqueous solvent, wettability of a porous polymer substrate with slurry for forming a porous coating layer is reduced due to the low surface energy of the porous polymer substrate. Therefore, a local portion where the porous coating layer is not formed uniformly may be generated. In addition, it is difficult to carry out uniform adhesion when assembling electrodes and the separator, resulting in deintercalation of lithium ions.

To solve the above-mentioned problem, there have been suggested some methods that include carrying out corona or plasma treatment on the surface of the porous polymer substrate to modify the surface of the porous polymer substrate, or using a polar solvent, such as ethanol. However, such methods cause an increase in processing cost or a risk of exposure to harmful materials, such as ozone. Thus, there is still a need for improvement.

DISCLOSURE

Technical Problem

The present disclosure is designed to solve the problems of the related art, and therefore the present disclosure is directed to providing a separator which uses an aqueous solvent as a solvent for slurry for forming a porous coating layer, shows improved wettability between the porous polymer substrate and the porous coating layer to provide improved adhesion between the separator and an electrode, and has reduced resistance.

The present disclosure is also directed to providing a method for manufacturing the separator.

Technical Solution

In one aspect of the present disclosure, there is provided a separator for a lithium secondary battery according to any one of the following embodiments.

According to the first embodiment of the present disclosure, there is provided a separator for a lithium secondary battery which includes:

a porous polymer substrate having a plurality of pores; and a porous coating layer formed on at least one surface of the porous polymer substrate, the porous coating layer comprising a dispersing agent, a mixture of inorganic particles and a particle-type binder polymer, and a polyvinyl pyrrolidone binder polymer positioned on the whole or a part of the surface of the inorganic particles in the mixture of the porous coating layer to connect and fix the inorganic particles with one another, wherein the content of the polyvinyl pyrrolidone binder polymer is 2 parts by weight to 20 parts by weight based on 100 parts by weight of the total content of the particle-type binder polymer and the polyvinyl pyrrolidone binder polymer, and the polyvinyl pyrrolidone binder polymer has a K-value of 60 to 130.

According to the second embodiment of the present disclosure, there is provided the separator for a lithium secondary battery as defined in the first embodiment, wherein the content of the polyvinyl pyrrolidone binder polymer is 4.66 parts by weight to 18.66 parts by weight based on 100 parts by weight of the total content of the particle-type binder polymer and the polyvinyl pyrrolidone binder polymer.

According to the third embodiment of the present disclosure, there is provided the separator for a lithium secondary battery as defined in the first or the second embodiment, wherein the dispersing agent includes at least one of cyanoethyl polyvinyl alcohol, polyvinyl butyral, polyvinyl alcohol, polyvinyl acetate, polyethylene oxide, polyarylate, cellulose acetate, cellulose acetate butyrate, cellulose acetate propionate, cyanoethyl pullulan, cyanoethyl cellulose, cyanoethyl sucrose, pullulan, or carboxymethyl cellulose.

According to the fourth embodiment of the present disclosure, there is provided the separator for a lithium secondary battery as defined in any one of the first to the third embodiments, wherein the particle-type binder polymer includes at least one of styrene butadiene rubber, acrylonitrile-butadiene rubber, acrylonitrile-butadiene-styrene rubber, polymethyl methacrylate-co-ethylhexyl acrylate, polyacrylonitrile, polyvinyl chloride, polyvinylidene fluoride, polyvinyl alcohol, styrene, or polycyanoacrylate.

According to the fifth embodiment of the present disclosure, there is provided the separator for a lithium secondary battery as defined in any one of the first to the fourth embodiments, wherein the weight ratio of the inorganic particles: (a total of particle-type binder polymer and polyvinyl pyrrolidone binder polymer) is 80:20 to 50:50.

According to the sixth embodiment of the present disclosure, there is provided the separator for a lithium secondary battery as defined in any one of the first to the fifth embodiments, wherein the porous polymer substrate is a polyolefin-based porous polymer film substrate or a porous polymer non-woven substrate.

According to the seventh embodiment of the present disclosure, there is provided the separator for a lithium secondary battery as defined in any one of the first to the sixth embodiments, wherein the porous polymer substrate is the polyolefin-based porous polymer film substrate, which includes at least one of polyethylene, polypropylene, polybutylene, or polypentene.

According to the eighth embodiment of the present disclosure, there is provided the separator for a lithium secondary battery as defined in any one of the first to the seventh embodiments, wherein the porous polymer substrate is a surface-treated-porous polymer substrate or is a non-surface treated porous polymer substrate.

According to the ninth embodiment of the present disclosure, there is provided the separator for a lithium secondary battery as defined in the eighth embodiment, wherein the porous polymer substrate is the surface-treated porous polymer substrate, which is surface-treated by plasma or corona discharge.

In another aspect of the present disclosure, there is also provided a method for manufacturing a separator according to any one of the following embodiments.

According to the tenth embodiment of the present disclosure, there is provided a method for manufacturing a separator for a lithium secondary battery, including the steps of:
(S1) preparing slurry for forming a porous coating layer including a plurality of inorganic particles, a dispersing agent and a particle-type binder polymer dispersed in a binder polymer solution containing a polyvinyl pyrrolidone binder polymer dissolved in a solvent, wherein the content of the polyvinyl pyrrolidone binder polymer is 2 parts by weight to 20 parts by weight based on 100 parts by weight of the total content of the particle-type binder polymer and the polyvinyl pyrrolidone binder polymer, and wherein the polyvinyl pyrrolidone binder polymer has a K-value of 60 to 130; and
(S2) applying the slurry for forming a porous coating layer onto at least one surface of a porous polymer substrate,
(S3) drying the slurry coated porous polymer substrate obtained by (S2), to form the porous coating layer on the porous polymer substrate.

According to the twelfth embodiment of the present disclosure, there is provided the method for manufacturing a separator for a lithium secondary battery as defined in the tenth embodiment, wherein the porous polymer substrate is a surface-treated porous polymer substrate or is a non-surface treated porous polymer substrate.

According to the thirteenth embodiment of the present disclosure, there is provided the method for manufacturing a separator for a lithium secondary battery as defined in the twelfth embodiment, wherein the porous polymer substrate is the surface-treated porous polymer substrate, which is surface-treated by plasma or corona discharge.

According to the fourteenth embodiment of the present disclosure, there is provided the method for manufacturing a separator for a lithium secondary battery as defined in any one of the tenth to the thirteenth embodiments, wherein the weight ratio of the inorganic particles: (a total of particle-type binder polymer and polyvinyl pyrrolidone binder polymer) is 80:20 to 50:50.

According to the fifteenth embodiment of the present disclosure, there is provided a lithium secondary battery including a cathode, an anode and a separator interposed between the cathode and the anode, wherein the separator is the same as defined in any one of the above-described embodiments.

Advantageous Effects

According to an embodiment of the present disclosure, it is possible to provide a separator having a Lami strength equivalent or similar to the Lami strength of the conventional separators without surface-treatment of a porous polymer substrate by using a polyvinyl pyrrolidone binder polymer for a porous coating layer.

According to an embodiment of the present disclosure, it is possible to provide a separator showing improved wettability of a porous polymer substrate without addition of a polar solvent to slurry for forming a porous coating layer by using a polyvinyl pyrrolidone binder polymer for a porous coating layer.

According to an embodiment of the present disclosure, it is possible to provide a separator having reduced resistance and improved adhesion to an electrode by controlling the content of the polyvinyl pyrrolidone binder polymer contained in the porous coating layer.

According to an embodiment of the present disclosure, since the polyvinyl pyrrolidone binder polymer has a predetermined range of K-values, it is possible to ensure mechanical and thermal properties, and to increase the manufacture processing efficiency by virtue of suitable viscosity despite introduction of a dispersing agent.

BEST MODE

Figure 1:
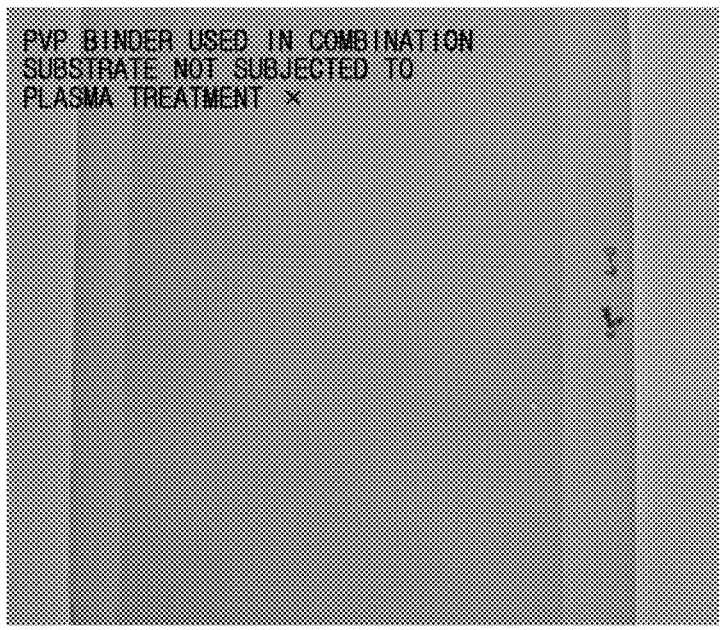
FIG. 1 illustrates wettability of the porous polymer substrate with the porous coating layer in the separator according to Example 1-1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part includes an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In a separator provided with a porous coating layer, when using an aqueous solvent and a particle-type binder polymer for slurry for forming a porous coating layer, it is possible to improve heat shrinkage at high temperature significantly.

However, when using an aqueous solvent, wettability of a porous polymer substrate with slurry for forming a porous coating layer is reduced due to the low surface energy of the porous polymer substrate. Therefore, a local portion where the porous coating layer is not formed uniformly may be generated. In addition, it is difficult to carry out uniform adhesion when assembling electrodes and the separator, resulting in deintercalation of lithium ions.

To solve the above-mentioned problem, there have been suggested some methods that include carrying out corona or plasma treatment on the surface of the porous polymer substrate to modify the surface of the porous polymer substrate, or using a polar solvent, such as ethanol. However, such methods cause an increase in processing cost or a risk of exposure to harmful materials, such as ozone. Thus, there is still a need for improvement.

The inventors of the present disclosure have conducted intensive studies to solve the above-mentioned problem. Thus, the present disclosure is directed to providing a separator which uses an aqueous solvent as a solvent for slurry for forming a porous coating layer, shows improved wettability between the porous polymer substrate and the porous coating layer to provide improved adhesion between the separator and an electrode, and has reduced resistance.

The present disclosure is also directed to providing a separator which shows improved wettability of a porous polymer substrate without addition of a polar solvent to slurry for forming a porous coating layer, provides adhesion between the separator and an electrode to a level equivalent or similar to the adhesion of the conventional separators, and has reduced resistance.

In addition, the present disclosure is directed to providing a separator which shows a Lami strength between the separator and an electrode to a level equivalent or similar to the Lami strength of the conventional separators without surface-treatment of the porous polymer substrate, and has low resistance.

In one aspect of the present disclosure, there is provided a separator for a lithium secondary battery which includes:

a porous polymer substrate having a plurality of pores; and a porous coating layer formed on at least one surface of the porous polymer substrate, and containing a dispersing agent, a mixture of inorganic particles and a particle-type binder polymer, and a polyvinyl pyrrolidone binder polymer positioned on the whole or a part of the surface of the particles in the mixture to connect the particles with one another and fix them, wherein the content of the polyvinyl pyrrolidone binder polymer is 2-20 parts by weight based on 100 parts by weight of the total content of the binder polymers, and the polyvinyl pyrrolidone binder polymer has a K-value of 60-130.

The separator according to an embodiment of the present disclosure includes a porous coating layer in which a plurality of inorganic particles is mixed with a particle-type binder polymer, and the surfaces of the inorganic particles and/or particle-type binder polymer are partially or totally interconnected and fixed by the polyvinyl pyrrolidone binder polymer.

As described above, in the case of the conventional separator having a porous coating layer formed by using an aqueous solvent and a particle-type binder polymer, the porous polymer substrate is pretreated with plasma, or the like, or a polar solvent, such as alcohol, is introduced to the aqueous solvent, due to low wettability of the porous polymer substrate with the aqueous solvent. For this, there are problems in that processing cost- and time-efficiency are reduced and environmental pollution occurs.

The inventors of the present disclosure have conducted intensive studies in order to improve wettability between the porous polymer substrate and slurry for forming a porous coating layer. As a result, the separator according to the present disclosure was controlled to have improved wettability between the porous polymer substrate and aqueous slurry for forming a porous coating layer by incorporating a polyvinyl pyrrolidone binder polymer to the slurry for forming a porous coating layer. In addition, the separator according to the present disclosure was controlled to have low resistance as well as to show a Lami strength equivalent or similar to the Lami strength of the separator including a porous polymer substrate subjected to pre-treatment, such as plasma treatment, or using a polar solvent introduced to the aqueous solvent.

It is thought that the above-results are derived from the polyvinyl pyrrolidone binder polymer which partially or totally connects and fixes the particle surfaces in the mixture of the inorganic particles and/or particle-type binder polymer.

According to the present disclosure, the polyvinyl pyrrolidone binder polymer is dissolved in a solvent, and partially or totally covers the particle surfaces in the mixture of the inorganic particles and/or particle-type binder polymer. Thus, the polyvinyl pyrrolidone binder polymer may partially or totally cover the particle surfaces in the mixture of the inorganic particles and/or particle-type binder polymer, in the form of a film.

In other words, the polyvinyl pyrrolidone binder used according to the present disclosure is not a particle-type binder polymer but a non-particle type binder polymer.

Herein, the content of the polyvinyl pyrrolidone binder polymer is 2-20 parts by weight based on 100 parts by weight of the total content of binder polymers. When introducing the polyvinyl pyrrolidone binder polymer within the above-defined range, the polyvinyl pyrrolidone binder polymer is dissolved in the aqueous solvent, and then connects the particle-type binder polymer and the inorganic particles with one another and fixes them. In addition, it is possible to accomplish anchoring between the pores in the porous polymer substrate and the porous coating layer. As a result, it is possible to provide a separator with increased adhesion between the separator and an electrode and low resistance by virtue of reduced content of the particle-type binder polymer. On the contrary, when the content of polyvinyl pyrrolidone binder polymer is less than 2 parts by weight based on 100 parts by weight of the total content of binder polymers, the content of non-particle type binder polymer capable of interconnecting and fixing the inorganic particles and the particle-type binder polymer is excessively low, resulting in a decrease in adhesion to an electrode or deintercalation of lithium ions, as well as an increase in resistance caused by squashing of the particle-type binder polymer.

Meanwhile, when the content of polyvinyl pyrrolidone binder polymer is larger than 20 parts by weight based on 100 parts by weight of the total content of binder polymers, resistance is increased and adhesion to an electrode is reduced. When the content of the polyvinyl pyrrolidone binder polymer is 2-20 parts by weight based on 100 parts by weight of the total content of binder polymers, the content of particle-type binder polymer capable of functioning as resistance in the total binder polymers is decreased relatively, and thus resistance is reduced. However, it is thought that when the content of polyvinyl pyrrolidone is larger than 20 parts by weight, the polyvinyl pyrrolidone binder polymer dissolved in the aqueous solvent blocks the pores formed on the porous coating layer or porous polymer substrate to cause an increase in resistance. It is also thought that when the content of the polyvinyl pyrrolidone is larger than 20 parts by weight, the content of particle-type binder polymer that significantly contributes to adhesion to an electrode is reduced relatively to cause a decrease in adhesion to an electrode.

As used herein, 'polyvinyl pyrrolidone binder polymer' is a water-soluble polymer and 5 wt % or more of polyvinyl pyrrolidone binder polymer is dissolved in water at 25° C.

According to the present disclosure, the polyvinyl pyrrolidone has a weight average molecular weight of 10,000-1,000,000, and typically includes vinyl pyrrolidone monomers in an amount more than 80 wt %, more than 90 wt %, or more than 96 wt %.

The polyvinyl pyrrolidone binder polymer has a K-value of 60-130. Herein, 'K-value' represents characteristics related with intrinsic viscosity of a binder polymer and is also referred to as Fikentscher's K-value. K-value may be determined by the method according to DIN EN ISO 1628-1.

According to the present disclosure, the polyvinyl pyrrolidone binder polymer has a K-value of 60-130. When the K-value is less than 60, it is difficult to ensure mechanical or thermal properties obtained by introducing a polyvinyl pyrrolidone binder polymer and to ensure adhesive property. When the K-value is larger than 130, viscosity is increased excessively due to the use of polyvinyl pyrrolidone, resulting in degradation of manufacture processing efficiency.

In addition, since the polyvinyl pyrrolidone binder polymer having a predetermined K-value is used in combination with a dispersing agent, it is easy to prepare slurry for forming a porous coating layer. When the polyvinyl pyrrolidone binder polymer having the above-defined K-value is used alone without any dispersing agent, dispersibility between the inorganic particles and the binder polymer is degraded to show an excessively high slurry sedimentation rate. In this case, it is not possible to perform coating of the substrate with the slurry.

Meanwhile, when using a dispersing agent without the polyvinyl pyrrolidone binder polymer having the above-defined K-value, adhesion is reduced or preparation of slurry becomes difficult. In this case, it is difficult to manufacture a separator itself.

According to an embodiment of the present disclosure, the K-value may be 60 or more, 65 or more, 70 or more, 80 or more, and less than 130, 125 or less, or 120 or less. For example, the K-value may be 65-125, or 80-120.

According to an embodiment of the present disclosure, the porous coating layer includes a dispersing agent. The dispersing agent is introduced to disperse the inorganic particles and particle-type binder polymer so that aggregation of solid content may be prevented during the formation of the porous coating layer.

According to the present disclosure, the dispersing agent may be introduced to water as a solvent together with the polyvinyl pyrrolidone binder polymer, or may be introduced to the aqueous solution formed after the polyvinyl pyrrolidone binder polymer is dissolved in water.

The dispersing agent may be adsorbed and present on the inorganic particles, or may be dispersed and present throughout the slurry for forming a porous coating layer.

According to a particular embodiment of the present disclosure, the dispersing agent may be a copolymer including an ionic backbone and a non-ionic side chain. For example, the ionic backbone of the dispersing agent may be a carboxylate, phosphate, sulfonate or sulfate. The non-ionic side chain of the dispersing agent is not particularly limited, as long as it has non-ionic property.

For example, the dispersing agent may include cyanoethyl polyvinyl alcohol, polyvinyl butyral, polyvinyl alcohol, polyvinyl acetate, polyethylene oxide, polyarylate, cellulose acetate, cellulose acetate butyrate, cellulose acetate propionate, cyanoethyl pullulan, cyanoethyl cellulose, cyanoethyl sucrose, pullulan, carboxymethyl cellulose, or a mixture thereof.

According to a particular embodiment of the present disclosure, the particle-type binder polymer has adhesive property, and provides binding force between the porous polymer substrate and the porous coating layer. In addition, the particle-type binder polymer functions to fix the inorganic particles and/or other particle-type binder polymers in the porous coating layer so that they may not be detached.

According to a particular embodiment of the present disclosure, the particle-type binder polymer is dispersed and present in an aqueous solvent, and has a spherical or pseudo-spherical shape. Herein, 'pseudo-spherical shape' has a three-dimensional volume, including an oval shape, and includes all types of particles, including amorphous particles, whose shape cannot be specified. However, when the particle-type binder polymer has a sphericity of approximately 1, pores can be ensured advantageously.

The particle-type binder polymer may be a microparticle polymer formed by emulsion polymerization, but is not limited thereto.

The emulsion polymerization method is not particularly limited. Any method for neutralizing monomers, an initiator and an emulsifier in an aqueous solvent, such as water, may be used, as long as it can provide a desired particle-type binder polymer according to the present disclosure. For example, a predetermined amount of emulsifier is mixed and agitated with a solvent, the resultant mixture is warmed, and then monomers are introduced thereto. Then, an initiator is introduced to induce polymerization of the monomers. The resultant product is allowed to stand for several minutes to several hours to obtain polymer particles as polymerized microparticles.

In the separator according to an embodiment of the present disclosure, the particle-type binder polymer may include rubber, a water-dispersible acrylic polymer, or a copolymer of acrylic polymer.

In addition, the particle-type binder polymer may include polyacrylonitrile, polyvinyl chloride, polyvinylidene fluoride, polyvinyl alcohol, styrene, poly cyanoacrylate, or a mixture thereof. Such a binder polymer has excellent adhesion, and thus can bind inorganic particles effectively even when it is used in a small amount.

Non-limiting examples of the rubber that may be used herein include any one selected from the group consisting of styrene butadiene rubber (SBR), acrylonitrile-butadiene rubber and acrylonitrile-butadiene-styrene rubber, or a mixture thereof.

In addition, the water-dispersible (meth)acrylic polymer may include any one selected from the group consisting of poly ethyl acrylate, poly ethyl methacrylate, polypropyl acrylate, polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate and polylauryl methacrylate, or a mixture thereof.

In addition, the copolymer of acrylic polymer may be polymethyl methacrylate-co-ethylhexyl acrylate, wherein methyl methacrylate and ethylhexyl acrylate are copolymerized at a molar ratio of 25:75-50:50.

The acrylic copolymer may be a copolymer polymerized from butyl methacrylate and butyl acrylate at a molar ratio of 25:75-50:50.

The particle-type binder polymer may have a core-shell structure. According to a particular embodiment of the present disclosure, the particle-type binder polymer may include an acrylic copolymer polymerized from butyl acrylate and methyl methacrylate in the core portion, and may include styrene in the shell portion.

According to a particular embodiment of the present disclosure, the porous coating layer may be formed on either surface or both surfaces of the porous polymer substrate.

According to the present disclosure, the porous polymer substrate is a porous membrane, and can provide channels through which lithium ions are transported, while electrically insulating an anode and a cathode from each other to prevent a short-circuit. Any porous polymer substrate may be used with no particularly limitation, as long as it is conventionally used as a material for a separator in an electrochemical device.

Particularly, the porous polymer substrate may be a porous polymer film substrate or a porous polymer nonwoven web substrate.

The porous polymer film substrate may be a porous polymer film including polyolefin, such as polyethylene, polypropylene, poly butene or polypentene. Such a polyolefin porous polymer film substrate may realize a shutdown function at a temperature of 80-130° C.

Herein, the polyolefin porous polymer film substrate may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a laminate structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, poly ether sulfone, polyphenylene oxide, polyphenylene sulfide, or polyethylene naphthalene, alone or in combination, besides the above-mentioned polyolefins In addition, although there is no particular limitation in the thickness of the porous substrate, the porous substrate has a thickness of 1-100 μm, particularly 5-50 μm. Recently, as batteries have been provided with high output/high capacity, it is advantageous that a thin film is used as a porous polymer substrate. The pores present in the porous polymer substrate may have a diameter of 10-100 nm, 10-70 nm, 10-50 nm, or 10-35 nm, and a porosity of 5-90%, preferably 20-80%. However, such numerical ranges may be varied if necessary or according to a particular embodiment.

The pores of the porous polymer substrate may have various types of pore structures. Any pore structure is included in the scope of the present disclosure, as long as any one average pore size selected from average pore size determined by using a porosimeter or average pore size observed through field emission scanning electron microscopy (FE-SEM) satisfies the above-defined range.

Herein, in the case of a uniaxially oriented dry separator generally known to those skilled in the art, the average pore size may be based on the central pore size in the pore size along the transverse direction (TD), not the pore size along the machine direction (MD). In a variant, in the case of a porous polymer substrate (e.g. wet polyethylene (PE) separator) having a network structure, the average pore size may be based on the pore size determined by using a porosimeter.

According to a particular embodiment of the present disclosure, the porous polymer substrate may be surface-treated or not. According to the present disclosure, the polyvinyl pyrrolidone binder polymer may interconnect and fix the inorganic particles and/or particle-type binder polymer on the porous coating layer, unlike the related art, while carrying out anchoring of the pores in the porous polymer substrate with the porous coating layer. Thus, even when using an aqueous solvent, wettability of the porous polymer substrate with slurry for forming a porous coating layer may be improved, resulting in improvement of adhesion between the separator and an electrode.

Meanwhile, when carrying out surface treatment of the porous polymer substrate, wettability between the porous polymer substrate and the porous coating layer is further improved, resulting in further improvement of adhesion between the separator and an electrode.

The porous polymer substrate may include a surface-modified layer through the surface treatment.

The surface treatment may be carried out by corona discharge or plasma discharge treatment.

The corona discharge is a phenomenon in which electric current flows while electrodes show a purple color, when a direct current power source is applied to a conductor as an electrode and a metal plate as a counter electrode. When the porous polymer substrate is subjected to corona discharge treatment, the surface is modified to be provided with hydrophilicity and the adhesion thereof to an aqueous solvent is improved.

The corona discharge treatment may be carried out by using a conventional method with no particular limitation, wherein the discharge dose may be 0.5-20 kW, but is not limited thereto.

The plasma discharge treatment uses plasma discharge formed by applying direct current voltage to conductors spaced apart by a predetermine distance to generate electric field E and allowing the electrons generated from the conductors thereby to collide with gas present between the conductors. Then, a separator is allowed to pass through a gap between two electrodes generating plasma discharge to perform modification of the polymer on the separator surface.

The plasma discharge treatment may be carried out by using a conventional method with no particular limitation, wherein the discharge dose may be 0.5-20 kV, but is not limited thereto.

The separator according to an embodiment of the present disclosure includes a porous coating layer formed on at least one surface of the porous polymer substrate, and containing a mixture of inorganic particles and a particle-type binder polymer, and a polyvinyl pyrrolidone binder polymer positioned on the whole or a part of the surface of the particles in the mixture to connect the particles with one another and fix them.

According to the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on $Li/Li^+$) of operating voltage of an applicable electrochemical device. Particularly, when using inorganic particles having a high dielectric constant as inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium ion transportability or a mixture thereof.

The inorganic particles having a dielectric constant of 5 or more may include any one selected from the group consisting of $Al_2O_3$, $SiO_2$, $ZrO_2$, $AlO(OH)$, $TiO_2$, $BaTiO_3$, $Pb(Zr,Ti)O_3$ (PZT, wherein $0<x<1$), $Pb_{1-x}La_xZr_{1-y}Ti_yCO_3$ (PLZT, wherein $0<x<1$, $0<y<1$), $(1-x)Pb(Mg_{1/2}Nb_{2/3})O_3-xPbTiO_3$ (PMN-PT, wherein $0<x<1$), hafnia ($HfO_2$), $SrTiO_3$, $SnO_2$, $CeO_2$, $MgO$, $NiO$, $CaO$, $ZnO$ and $SiC$, or a mixture of thereof.

The inorganic particles having lithium ion transportability may be any one selected from the group consisting of include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or a mixture thereof.

In addition, there is no particular limitation in the average particle diameter of the inorganic particles. However, the inorganic particles preferably have an average particle diameter of 0.001-10 μm in order to form a coating layer with a uniform thickness and to provide suitable porosity. When the inorganic particles have an average particle diameter less than 0.001 μm, they may show low dispersibility. When the inorganic particles have an average particle diameter larger than 10 μm, the resultant coating layer may have an increased thickness.

The weight ratio of the inorganic particles to the total binder polymers may be 80:20-50:50. Herein, 'the total binder polymers' refers to the total content of binder polymers including the particle-type binder and polyvinyl pyrrolidone binder polymer. When the weight ratio of the inorganic particles to the total binder polymers satisfies the above-defined range, it is possible to prevent the problem of a decrease in pore size and porosity of the resultant coating layer, caused by an increase in content of the binder polymer. It is also possible to solve the problem of degradation of peeling resistance of the resultant coating layer, caused by a decrease in content of the binder polymer.

Although there is no particular limitation in the thickness of the porous coating layer, the porous coating layer may have a thickness of 1-10 μm, particularly 1.5-6 μm. In addition, the porous coating layer preferably has a porosity of 35-65% but is not limited thereto.

The separator according to an embodiment of the present disclosure may further include other additives as ingredients of the porous coating layer, besides the inorganic particles and binder polymer.

In another aspect of the present disclosure, the method for manufacturing a separator for a lithium secondary battery, includes the steps of:

(S1) preparing slurry for forming a porous coating layer including a plurality of inorganic particles, a dispersing agent and a particle-type binder polymer dispersed in a binder polymer solution containing a polyvinyl pyrrolidone binder polymer dissolved in a solvent, wherein the content of the polyvinyl pyrrolidone binder polymer is 2-20 parts by weight based on 100 parts by weight of the total content of the binder polymers, and the polyvinyl pyrrolidone binder polymer has a K-value of 60-130; and (S2) applying the slurry for forming a porous coating layer onto at least one surface of a porous polymer substrate, followed by drying, to form a porous coating layer.

First, a binder polymer solution containing the polyvinyl pyrrolidone binder polymer dissolved in a solvent is prepared.

According to an embodiment of the present disclosure, the solvent is water. According to the present disclosure, it is possible to provide a separator which shows improved adhesion to an electrode and has reduced resistance, without addition of a polar solvent, such as alcohol, by incorporating the polyvinyl pyrrolidone binder polymer to the slurry for forming a porous coating layer.

Meanwhile, the content of the polyvinyl pyrrolidone binder polymer is 2-20 parts by weight based on 100 parts by weight of the total content of binder polymers. When introducing the polyvinyl pyrrolidone binder polymer within the above-defined range, the polyvinyl pyrrolidone binder polymer is dissolved in the aqueous solvent, and then connects the particle-type binder polymer and the inorganic particles with one another and fixes them. In addition, it is possible to accomplish anchoring between the pores in the porous polymer substrate and the porous coating layer. As a result, it is possible to provide a separator with increased adhesion between the separator and an electrode and low resistance by virtue of reduced content of the particle-type binder polymer.

On the contrary, when the content of polyvinyl pyrrolidone binder polymer is less than 2 parts by weight based on 100 parts by weight of the total content of binder polymers, the content of non-particle type binder polymer capable of interconnecting and fixing the inorganic particles and the particle-type binder polymer is excessively low, resulting in a decrease in adhesion to an electrode or deintercalation of lithium ions, as well as an increase in resistance caused by squashing of the particle-type binder polymer.

Meanwhile, when the content of polyvinyl pyrrolidone binder polymer is larger than 20 parts by weight based on 100 parts by weight of the total content of binder polymers, resistance is increased and adhesion to an electrode is reduced. When the content of polyvinyl pyrrolidone binder polymer is 2-20 parts by weight based on 100 parts by weight of the total content of binder polymers, the content of particle-type binder polymer capable of functioning as resistance in the total binder polymers is decreased relatively, and thus resistance is reduced. However, it is thought that when the content of polyvinyl pyrrolidone is larger than 20 parts by weight, the polyvinyl pyrrolidone binder polymer dissolved in the aqueous solvent blocks the pores formed on the porous coating layer or porous polymer substrate to cause an increase in resistance. It is also thought that when the content of polyvinyl pyrrolidone is larger than 20 parts by weight, the content of particle-type binder polymer that significantly contributes to adhesion to an electrode is reduced relatively to cause a decrease in adhesion to an electrode.

Meanwhile, according to the present disclosure, the dispersing agent may be introduced to the binder polymer solution together with the polyvinyl pyrrolidone binder polymer, or before or after introducing the polyvinyl pyrrolidone binder polymer. In a variant, the dispersing agent may be introduced simultaneously with the inorganic particles, or before or after introducing the inorganic particles.

The polyvinyl pyrrolidone binder polymer has a K-value of 60-130.

When the K-value is less than 60, it is difficult to ensure mechanical or thermal properties obtained by introducing a polyvinyl pyrrolidone binder polymer and to ensure adhesive property. When the K-value is larger than 130, viscosity is increased excessively due to the use of polyvinyl pyrrolidone, resulting in degradation of manufacture processing efficiency.

In addition, since the polyvinyl pyrrolidone binder polymer having a predetermined K-value is used in combination with a dispersing agent, it is easy to prepare slurry for forming a porous coating layer. When the polyvinyl pyrrolidone binder polymer having the above-defined K-value is used alone without any dispersing agent, dispersibility between the inorganic particles and the binder polymer is degraded to show an excessively high slurry sedimentation rate. In this case, it is not possible to perform coating of the substrate with the slurry.

Meanwhile, when using a dispersing agent without the polyvinyl pyrrolidone binder polymer having the above-defined K-value, adhesion is reduced or preparation of slurry becomes difficult. In this case, it is difficult to manufacture a separator itself.

Next, a plurality of inorganic particles and a particle-type binder polymer are introduced to and dispersed in the binder polymer solution to prepare slurry for forming a porous coating layer containing the particles dispersed therein. The inorganic particles and/or particle-type binder polymer may be added after they are pulverized in advance to a predetermined average particle diameter. Otherwise, the inorganic particles and/or particle-type binder polymer may be added to the binder polymer solution, and then pulverized and dispersed while controlling them to have a predetermined average particle diameter by using a ball milling process, or the like.

Then, the slurry for forming a porous coating layer is applied to at least one surface of the porous polymer substrate, followed by drying, to form a porous coating layer (S2).

Although there is no particular limitation in the process for coating the slurry for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the slurry for forming a porous coating layer is dried by using a dryer, such as an oven, thereby forming porous coating layers on at least one surface of the porous substrate.

In the porous coating layer, the inorganic particles and/or particle-type binder polymer are bound to one another by the polyvinyl pyrrolidone binder polymer, while they are packed and are in contact with each other. Thus, interstitial volumes are formed among the inorganic particles and/or particle-type binder polymer and the interstitial volumes in the inorganic particles or particle-type binder polymer may become vacant spaces to form pores.

In other words, the polyvinyl pyrrolidone binder polymer attaches the inorganic particles and/or particle-type binder polymer to one another so that they may retain their binding states. For example, the binder polymer connects and fixes the inorganic particles and/or particle-type binder polymer with one another. In addition, the pores of the porous coating layer are those formed by the interstitial volumes among the inorganic particles and/or particle-type binder polymer which become vacant spaces. The space may be defined by the inorganic particles and/or particle-type binder polymer facing one another substantially in a closely packed or densely packed structure of the inorganic particles and/or particle-type binder polymer.

In still another aspect of the present disclosure, there is provided an electrochemical device including a cathode, an anode and a separator interposed between the cathode and the anode, wherein the separator is the above-described separator.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxy ethane, diethoxy ethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1-1

1) Manufacture of Anode

Artificial graphite, carbon black, carboxymethyl cellulose (CMC) and styrene butadiene rubber (SBR) were introduced to water at a weight ratio of 96:1:2:2 and mixed therein to prepare anode slurry. The anode slurry was coated onto copper (Cu) foil having a thickness of 50 μm as an anode current collector at a capacity of 3.55 mAh/g to form a thin electrode plate, which, in turn, was dried at 135° C. for 3 hours or more and then pressed to obtain an anode.

2) Manufacture of Cathode $LiNi_{0.6}Co_{0.2}Mn_{0.2}O_2$ as a cathode active material, carbon black and polyvinylidene fluoride (PVdF) were introduced to N-methyl-2-pyrrolidone at a weight ratio of 96:2:2 and mixed therein to prepare cathode slurry. The cathode slurry was coated on aluminum foil having a thickness of 20 μm as a cathode current collector at a capacity of 3.28 mAh/cm$^2$ to obtain a cathode.

3) Manufacture of Separator

A polyvinyl pyrrolidone binder polymer was introduced to water and dissolved therein at 50° C. for about 4 hours to prepare a binder polymer solution.

Then, $Al_2O_3$ as inorganic particles (Alteo Co., P172LSB, particle size: 500 nm), polymethyl methacrylate-co-ethylhexyl acrylate (Hansol Chemical Co., HC12) as a particle-type binder polymer and carboxymethyl cellulose as a binder polymer were introduced to the binder polymer solution, and the inorganic particles were pulverized and dispersed by using a ball milling process for 12 hours to prepare slurry for forming a porous coating layer having a solid content of 20%.

Herein, the composition of slurry for forming a porous coating layer was controlled as shown in the following Table 1.

The slurry for forming a porous coating layer was applied to both surfaces of a polyethylene porous film (thickness 9 μm, porosity 45%) through a dip coating process under the conditions of 23° C. and a relative humidity of 40% to a total loading amount of 13.5 g/m$^2$. Then, the slurry was dried to obtain a separator having a porous coating layer.

4) Adhesion Between Separator and Electrode

Then, the separator was stacked on the electrode in such a manner that the porous coating layer of the separator might face the anode active material layer of the electrode obtained from 1), and pressing was carried out at 70° C. under 600 kgf for 1 second to obtain an electrode assembly including the anode laminated with the separator.

Examples 2-1 to 4-1

Electrode assemblies were obtained in the same manner as Example 1-1, except that the composition of the slurry for forming a porous coating layer was controlled as shown in Table 1.

Examples 1-2 to 4-2

Electrode assemblies were obtained in the same manner as Example 1-1, except that the porous polymer substrate in each of Examples 1-1 to 4-1 was subjected to plasma discharge treatment. Particularly, the plasma discharge treatment was carried out by using a plasma power supply instrument (Plasma Life Co.) under the condition of 10 kV at 5 m/min.

Comparative Examples 1-1 and 2-1

Electrode assemblies were obtained in the same manner as Example 1-1, except that the composition of the slurry for forming a porous coating layer was controlled as shown in Table 1.

Comparative Examples 1-2 and 2-2

In the case of Comparative Example 1-2, an electrode assembly was obtained in the same manner as Comparative Example 1-1, except that the porous polymer substrate of Comparative Example 1-1 was subjected to plasma discharge treatment. Particularly, the plasma discharge treatment was carried out by using a plasma power supply instrument (Plasma Life Co.) under the condition of 10 kV at 5 m/min.

In the case of Comparative Example 2-2, an electrode assembly was obtained in the same manner as Comparative Example 2-1, except that the porous polymer substrate of Comparative Example 2-1 was subjected to plasma discharge treatment.

Comparative Example 3

An electrode assembly was obtained in the same manner as Example 1-1, except that the polyethylene porous film having a thickness of 9 μm was used as it is, i.e. without forming a porous coating layer.

The pores in the porous polymer substrate has an average size of 43.9 nm and the porosity was 45%.

Comparative Example 4

An electrode assembly was obtained in the same manner as Example 1-1, except that no dispersing agent was introduced.

Meanwhile, when the polyvinyl pyrrolidone binder polymer having a K-value of 120 is introduced with no dispersing agent according to Comparative Example 4, it was not possible to prepare slurry for forming a porous coating layer with ease. Thus, it was not possible to manufacture a separator itself.

Comparative Examples 5 and 6

Electrode assemblies were obtained in the same manner as Example 1-1, except that the K-value of polyvinyl pyrrolidone binder polymer was controlled as shown in Table 1.

Even when using a dispersing agent according to Comparative Example 5, use of a polyvinyl pyrrolidone binder polymer having a K-value less than 60 causes degradation of adhesive property, resulting in significant degradation of adhesion between the separator and the electrode. Thus, it is difficult to apply the separator to a separator for an electrochemical device.

Even when using a dispersing agent according to Comparative Example 6, use of a polyvinyl pyrrolidone binder polymer having a K-value larger than 130 makes it difficult to prepare slurry for forming a porous coating layer with ease. Thus, it is not possible to manufacture a separator itself.

TABLE 1

| | | Ex. 1-1 | Ex. 1-2 | Ex. 2-1 | Ex 2-2 | Ex 3-1 | Ex. 3-2 | Ex. 4-1 | Ex. 4-2 |
|---|---|---|---|---|---|---|---|---|---|
| Inorganic particles (alumina) (%) | | 70 | 70 | 70 | 70 | 70 | 70 | 70 | 70 |
| Binder Polymer | Polyvinyl pyrrolidone (%) | 1.4 (K-value: 120) | 1.4 (K-value: 120) | 2.8 (K-value: 120) | 2.8 (K-value: 120) | 42 (K-value: 120) | 42 (K-value: 120) | 5.6 (K-value: 120) | 5.6 (K-value: 120) |
| | Polymethyl methacrylate-coethylhexyl acrylate (%) | 27.2 | 27.2 | 25.8 | 25.8 | 24.4 | 24.4 | 23.0 | 23.0 |
| | Carboxymethyl cellulose (%) | 1.4 | 1.4 | 1.4 | 1.4 | 1.4 | 1.4 | 1.4 | 1.4 |
| Introduction of alcohol to solvent | | X | X | X | X | X | X | X | X |
| Plasma treatment | | X | O | X | O | X | O | X | O |
| Thickness (μm) | | 11.9 | 12.3 | 12.8 | 12.0 | 13.4 | 12.5 | 13.0 | 11.9 |
| Loading amount of slurry for forming porous coating layer (g/m$^2$) | | 5.4 | 5.7 | 6.4 | 5.5 | 7.1 | 6.2 | 6.6 | 5.6 |
| Air permeability (s/100 cc) | | 102 | 107 | 105 | 110 | 121 | 158 | 136 | 190 |
| Lami Strength (gf/15 mm) | | 11 | 22 | 12 | 25 | 12 | 22 | 17 | 21 |
| Resistance (ohm) | | 0.81 | 0.82 | 0.83 | 0.87 | 0.89 | 0.93 | 0.93 | 0.95 |

| | | Comp. Ex. 1-1 | Comp. Ex. 1-2 | Comp. Ex. 2-1 | Comp. Ex. 2-2 | Comp. Ex. 3 | Comp. Ex. 4 | Comp. Ex. 5 | Comp. Ex. 6 |
|---|---|---|---|---|---|---|---|---|---|
| Inorganic particles (alumina) (%) | | 70 | 70 | 70 | 70 | | 70 | 70 | 70 |
| Binder Polymer | Polyvinyl pyrrolidone (%) | 7.0 (K-value: 120) | 7.0 (K-value: 120) | 0 | 0 | — | 2.8 (K-value: 120) | 14 (K-value: 15) | 1.4 (K-value: 150) |
| | Polymethyl methacrylate- | 21.6 | 216. | 28.6 | 28.6 | — | 27.2 | 27.2 | 27.2 |

TABLE 1-continued

|  | | | | | | | | |
|---|---|---|---|---|---|---|---|---|
| coethylhexyl acrylate (%) | | | | | | | | |
| Carboxymethyl cellulose (%) | 1.4 | 1.4 | 1.4 | 1.4 | — | 0 | 1.4 | 1.4 |
| Introduction of alcohol to solvent | X | X | X | O | — | X | X | X |
| Plasma treatment | X | O | X | O | — | X | X | X |
| Thickness (μm) | 15.5 | 15.2 | 11.9 | 11.4 | 8.5 | Slurry cannot be prepared | 10.6 | Slurry cannot be prepared |
| Loading amount of slurry for forming porous coating layer (g/m$^2$) | 6.4 | 5.9 | 5.3 | 4.2 | 4.5 | — | 4.8 | — |
| Air permeability (s/100 cc) | 195 | 221 | 88 | 82 | 70 | — | 95 | — |
| Lami Strength (gf/15 mm) | 8 | 14 | 10 | 14 | — | — | 7 | — |
| Resistance (ohm) | 0.96 | 1.02 | 1.03 | 1.02 | 0.39 | — | 0.80 | — |

Evaluation Results

Each of the electrode assemblies according to Examples and Comparative Examples was evaluated in terms of thickness, particle diameter, separator-anode adhesion (gf/15 mm) and resistance. The results are shown in Table 1.

As shown in Table 1, in the case of Examples 1-1 to 4-2, it can be seen that each electrode assembly has a lower resistance value and higher Lami strength, as compared to Comparative Examples 1-1 to 3.

Particularly, when the content of polyvinyl pyrrolidone is 0 according to Comparative Example 2-1, the electrode assembly shows low Lami strength to provide low adhesion to an electrode, but has high resistance. Thus, it can be seen that the separator according to Comparative Example 2-1 shows lower quality as compared to Examples according to the present disclosure.

In addition, when the content of polyvinyl pyrrolidone is 7 wt % according to Comparative Example 1-1, the separator shows increased Lami strength and low resistance, and thus shows lower quality as compared to Examples according to the present disclosure.

Then, in the case of Comparative Example 3 including no porous coating layer, it is difficult to expect adhesion to the electrode.

Meanwhile, Examples 1-1, 2-1, 3-1 and 4-1 are embodiments wherein the porous polymer substrate is not subjected to plasma treatment, while Examples 1-2, 2-2, 3-2 and 4-2 are embodiments wherein the porous polymer substrate is subjected to plasma treatment. As can be seen from Table 1, each separator subjected to plasma treatment shows a resistance value similar to the resistance of each separator not subjected to plasma treatment, while it shows a higher Lami strength value as compared to each separator not subjected to plasma treatment. Thus, it can be seen that a separator subjected to plasma treatment is more preferred.

Figure 3:
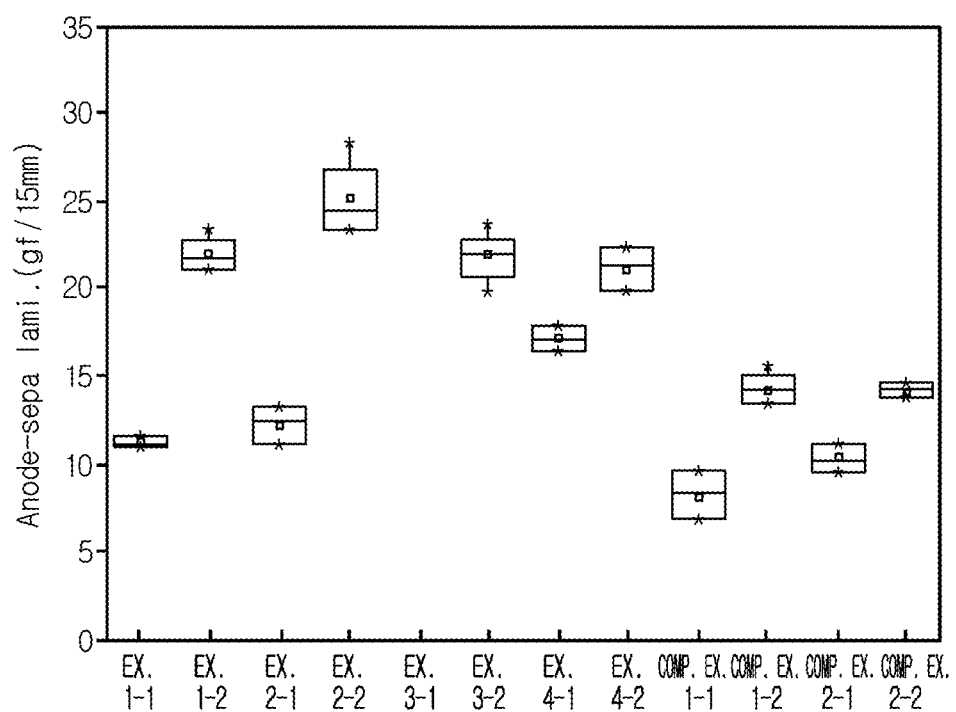
FIG. 3 is a graph illustrating adhesion between a separator and an electrode in the separators according to Examples and Comparative Examples.

In Examples 1-1 to 4-2, Examples 1-1, 1-2, 2-1 and 2-2 are embodiments wherein the content of polyvinyl pyrrolidone is 4.66 and 9.33 parts by weight based on 100 parts by weight of the total content of binder polymers. In this case, as can be seen from Table 1 and FIG. 3, each separator has low resistance and shows a relatively high increase in Lami strength, and thus is particularly preferred.

Figure 2:
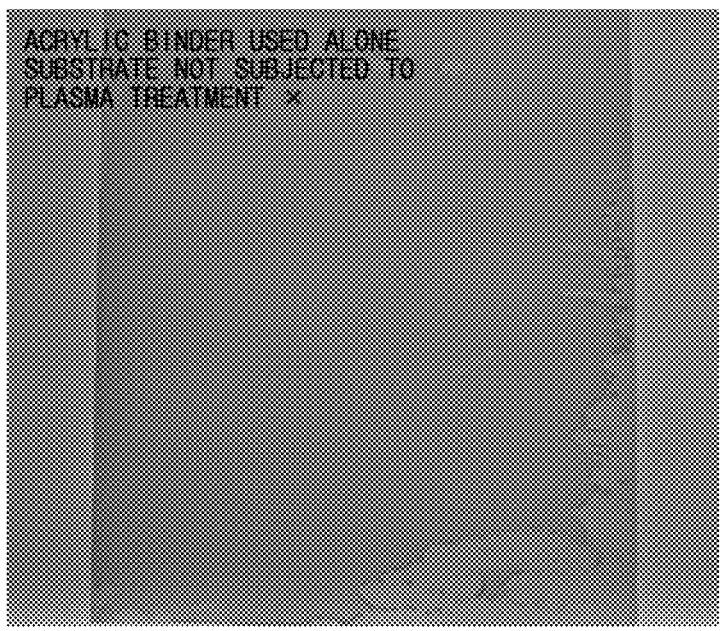
FIG. 2 illustrates wettability of the porous polymer substrate with the porous coating layer in the separator according to Comparative Example 2-1.

Meanwhile, FIG. 1 illustrates wettability of the porous polymer substrate with the porous coating layer in the separator according to Example 1-1. FIG. 2 illustrates wettability of the porous polymer substrate with the porous coating layer in the separator according to Comparative Example 2-1. As can be seen from FIG. 1, even though the porous polymer substrate is not subjected to plasma treatment, wettability of the porous polymer substrate with the porous coating layer is higher as compared to the separator illustrated in FIG. 2.

Particular test methods are as follows.

1) Determination of Separator-Anode Adhesion (Gf/15 mm) (Lami Strength)

An anode was manufactured in the same manner as Example 1-1) and cut into a size of 15 mm×100 mm. Each of the separators according to Examples 1-1 to 4-2 and Comparative Examples 1-1 to 3 was cut into a size of 25 mm×100 mm. The separator was stacked with the anode, and the stack was inserted between PET films having a thickness of 100 μm and adhered by using a flat press. Herein, the flat press was heated and pressurized at 70° C. under a pressure of 600 kgf for 1 second. The adhered separator and anode were attached to slide glass by using a double-sided tape. The end portion (10 mm or less from the end of the adhered surface) of the separator was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the upper holder of the UTM instrument. Then, force was applied at 180° and a rate of 300 mm/min. The force required for separating the anode from the porous coating layer facing the anode was measured. The results are shown in Table 1 and FIG. 3.

2) Determination of Resistance

Each of the separators according to Examples 1-1 to 4-2 and Comparative Examples 1-1 to 3 was impregnated with an electrolyte and the resistance was measured. The resistance was determined by using 1M LiPF$_6$-ethylene carbonate/ethyl methyl carbonate (weight ratio 3:7) as an electrolyte at 25° C. through an alternate current process.

3) Determination of Thickness

The thickness of each separator was determined by using a thickness tester (Mitutotyo, VL-50S-B).

4) Determination of Air Permeability

The air permeability was determined by using a Gurley type air permeability tester according to JIS P-8117. Herein, the time required for 100 mL of air to pass through a diameter of 28.6 mm and an area of 645 mm$^2$ was measured.

5) Determination of Surface Energy and Contact Angle

Variations in surface properties of the porous polymer substrate not subjected to plasma treatment according to Example 1-1 and the porous polymer substrate subjected to plasma treatment according to Example 1-2 were analyzed by surface energy and contact angle as follows.

Particularly, surface energy was calculated through the Owens-Wendt theory. In addition, contact angle was determined by dropping 1 μL at room temperature (25° C.) by using a contact angle tester (Kyowagaimen Chemical, DM-301) repeatedly at least 3 times and calculating the average value.

TABLE 2

|  |  | Contact angle | | Surface energy | | | Polarity |
|---|---|---|---|---|---|---|---|
|  |  | H$_2$O (o) | MI (o) | Γs(mN/m) | Γs$^d$ (mN/m) | Γs$^p$ (mN/m) | ($\gamma_s^P/\gamma s$) |
| Ex. 1-1 | Top | 120.1 ± 9 | 41.9 ± 1.2 | 41.0 | 38.6 | 2.32 | 0.057 |
|  | Back | 119.8 ± 0.9 | 42.9 ± 1.1 | 40.3 | 38.1 | 2.17 | 0.054 |
| Ex. 1-2 | 1 day | 101.5 ± 0.6 | 21.2 ± 0.9 | 47.6 | 47.4 | 0.18 | 0.004 |
|  | 2 days | 102.1 ± 0.4 | 25.6 ± 0.9 | 46.1 | 45.9 | 0.16 | 0.004 |
|  | 4 days | 103.6 ± 0.2 | 29.3 ± 0.4 | 44.7 | 44.5 | 0.21 | 0.005 |
|  | 7 days | 104.2 ± 0.9 | 30.0 ± 0.2 | 44.5 | 44.2 | 0.25 | 0.005 |

As a porous polymer substrate shows a larger surface energy, wettability with a polar solvent, such as water, may be improved. On the contrary, as a porous polymer substrate shows a lower surface energy, contact area with a solvent is increased and contact angle is reduced.

The contact angle and surface energy parameters are terms used conventionally in the art.

As can be seen from Table 2, when the porous polymer substrate is surface-treated with plasma according to Example 1-2, contact angle is reduced so that wettability of the porous polymer substrate with the slurry for forming a porous coating layer may be improved.

What is claimed is:

1. A separator for a lithium secondary battery, comprising:
   a porous polymer substrate having a plurality of pores, wherein the porous polymer substrate comprises a polyolefin-based porous polymer film substrate, and the polyolefin of the polyolefin-based porous polymer film substrate consists of polyethylene; and
   a porous coating layer formed on at least one surface of the porous polymer substrate, the porous coating layer comprising a dispersing agent, a mixture of inorganic particles and a particle-type binder polymer, and a polyvinyl pyrrolidone binder polymer positioned as a film on a whole or a part of a surface of the inorganic particles in the mixture of the porous coating layer to connect and fix the inorganic particles with one another,
   wherein the polyvinyl pyrrolidone binder polymer is a water-based binder,
   wherein a content of the polyvinyl pyrrolidone binder polymer is 4.66 parts by weight to 9.33 parts by weight based on 100 parts by weight of a total content of the particle-type binder polymer and the polyvinyl pyrrolidone binder polymer,
   wherein the polyvinyl pyrrolidone binder polymer has a K-value of 120 to 130, and the weight average molecular weight of the polyvinyl pyrrolidone binder polymer is 10,000 to 1,000,000,
   wherein the dispersing agent comprises at least one of polyvinyl butyral, polyvinyl alcohol, polyvinyl acetate, polyethylene oxide, polyarylate, cellulose acetate, cellulose acetate butyrate, cellulose acetate propionate, pullulan, or carboxymethyl cellulose, and
   wherein the particle-type binder polymer comprises polymethyl methacrylate-co-ethylhexyl acrylate.

2. The separator for a lithium secondary battery according to claim 1, wherein the dispersing agent further comprises at least one of cyanoethyl polyvinyl alcohol, cyanoethyl pullulan, cyanoethyl cellulose, or cyanoethyl sucrose.

3. The separator for a lithium secondary battery according to claim 1, wherein a weight ratio of the inorganic particles: (a total of particle-type binder polymer and polyvinyl pyrrolidone binder polymer) is 80:20 to 50:50.

4. The separator for a lithium secondary battery according to claim 1, wherein the porous polymer substrate is a surface-treated-porous polymer substrate or is a non-surface treated porous polymer substrate.

5. The separator for a lithium secondary battery according to claim 4, wherein the porous polymer substrate is the surface-treated porous polymer substrate, which is surface-treated by plasma or corona discharge.

6. A method for manufacturing a separator for a lithium secondary battery, comprising the steps of:
   (S1) preparing slurry for forming a porous coating layer comprising a plurality of inorganic particles, a dispersing agent and a particle-type binder polymer dispersed in a binder polymer solution comprising a polyvinyl pyrrolidone binder polymer dissolved in a solvent,
   wherein the solvent comprises a water-based solvent,
   wherein a content of the polyvinyl pyrrolidone binder polymer is 4.66 parts by weight to 9.33 parts by weight based on 100 parts by weight of a total content of the particle-type binder polymer and the polyvinyl pyrrolidone binder polymer, and wherein the polyvinyl pyrrolidone binder polymer has a K-value of 120 to 130, and the weight average molecular weight of the polyvinyl pyrrolidone binder polymer is 10,000 to 1,000,000,
   wherein the dispersing agent comprises at least one of polyvinyl butyral, polyvinyl alcohol, polyvinyl acetate, polyethylene oxide, polyarylate, cellulose acetate, cellulose acetate butyrate, cellulose acetate propionate, pullulan, or carboxymethyl cellulose, and
   wherein the particle-type binder polymer comprises polymethyl methacrylate-co-ethylhexyl acrylate; and
   (S2) applying the slurry for forming the porous coating layer onto at least one surface of a porous polymer substrate, wherein the porous polymer substrate comprises a polyolefin-based porous polymer film substrate, and the polyolefin of the polyolefin-based porous polymer film substrate consists of polyethylene,
   (S3) drying the slurry coated porous polymer substrate obtained by (S2), to form the porous coating layer on the porous polymer substrate, wherein the porous coating layer is formed on at least one surface of the porous polymer substrate, the porous coating layer comprising the dispersing agent, a mixture of the inorganic particles and the particle-type binder polymer particles with the slurry, and the polyvinyl pyrrolidone binder polymer is positioned as a film on a whole or a part of a surface of the inorganic particles in the mixture of the porous coating layer to connect and fix the inorganic particles with one another.

7. The method for manufacturing a separator for a lithium secondary battery according to claim 6, wherein the solvent is water.

8. The method for manufacturing a separator for a lithium secondary battery according to claim 6, wherein the porous polymer substrate is a surface-treated-porous polymer substrate or is a non-surface treated porous polymer substrate.

9. The method for manufacturing a separator for a lithium secondary battery according to claim 8, wherein the porous polymer substrate is the surface-treated porous polymer substrate, which is surface-treated by plasma or corona discharge.

10. The method for manufacturing a separator for a lithium secondary battery according to claim 6, wherein a weight ratio of the inorganic particles: (a total of particle-type binder polymer and polyvinyl pyrrolidone binder polymer) is 80:20 to 50:50.

11. A lithium secondary battery comprising a cathode, an anode and a separator interposed between the cathode and the anode, wherein the separator is the separator according to claim 1.

12. The separator for a lithium secondary battery according to claim 1, wherein the porous polymer substrate is a surface-treated porous polymer substrate, which is surface-treated by corona discharge.

13. The method for manufacturing a separator for a lithium secondary battery according to claim 6, wherein the porous polymer substrate is a surface-treated porous polymer substrate, which is surface-treated by corona discharge.

* * * * *